US010641639B2

(12) United States Patent
Bordignon et al.

(10) Patent No.: US 10,641,639 B2
(45) Date of Patent: May 5, 2020

(54) OPTICAL LEVEL SENSOR FOR WASH AID REMOVABLE CONTAINER

(71) Applicant: ILLINOIS TOOL WORKS INC., Glenview, IL (US)

(72) Inventors: Davide Bordignon, Travedona (IT); Marco Sclip, Sumirago (IT)

(73) Assignee: Illinois Tool Works Inc., Glenview, IL (US)

( * ) Notice: Subject to any disclaimer, the term of this patent is extended or adjusted under 35 U.S.C. 154(b) by 140 days.

(21) Appl. No.: 15/829,607

(22) Filed: Dec. 1, 2017

(65) Prior Publication Data

US 2018/0164141 A1 Jun. 14, 2018

Related U.S. Application Data

(60) Provisional application No. 62/432,776, filed on Dec. 12, 2016.

(51) Int. Cl.
*G01F 23/20* (2006.01)
*G01F 23/292* (2006.01)
*D06F 39/02* (2006.01)

(52) U.S. Cl.
CPC ........ *G01F 23/292* (2013.01); *G01F 23/2922* (2013.01); *G01F 23/2924* (2013.01); *G01F 23/2927* (2013.01); *D06F 39/02* (2013.01); *D06F 39/022* (2013.01)

(58) Field of Classification Search
CPC ............... G01F 23/292; G01F 23/2927; G01F 23/2922; G01F 23/2924; D06F 39/02; D06F 39/022
See application file for complete search history.

(56) References Cited

U.S. PATENT DOCUMENTS

| 4,713,552 | A | 12/1987 | Denis et al. | |
| 5,616,929 | A * | 4/1997 | Hara | B41J 2/17513 250/573 |
| 6,361,136 | B1 * | 3/2002 | Watanabe | B41J 2/17546 347/19 |
| 2009/0235962 | A1 | 9/2009 | Classen et al. | |
| 2012/0133759 | A1 | 5/2012 | Giordano et al. | |

FOREIGN PATENT DOCUMENTS

| CN | 202403767 U | 8/2012 |
| CN | 202793526 U | 3/2013 |
| EP | 0860284 A2 | 8/1998 |
| JP | 2004198376 A | 7/2004 |

* cited by examiner

*Primary Examiner* — Tony Ko
(74) *Attorney, Agent, or Firm* — Boyle Fredrickson, S.C.

(57) ABSTRACT

A liquid level sensing system provides a removable reservoir incorporating a reflective surface that can be interrogated by a stationary optical sensor in a receptacle receiving the removable reservoir. The optical sensor may detect the presence of the liquid within the reservoir without connection to the reservoir simplifying the process of making the reservoir removable while still allowing sensing of its contents. By aligning the optical axis with the insertion axis of the reservoir sensitive optical alignment problems are minimized.

17 Claims, 5 Drawing Sheets

OPTICAL LEVEL SENSOR FOR WASH AID REMOVABLE CONTAINER

CROSS-REFERENCE RELATED APPLICATIONS

This application claims the benefit of provisional application 62/432,776 filed Dec. 12, 2016, and hereby incorporated by reference.

FIELD OF THE INVENTION

The present invention relates to washing-aid dispensers in appliances and in particular to a level sensing system designed for a removable reservoir for a washing-aid dispenser providing for automatic level sensing.

BACKGROUND OF THE INVENTION

Washing machines, for example, for commercial or residential use, may provide an internal spin basket into which clothing may be placed. An agitator may extend into the spin basket for agitating or stirring the clothing during washing. The agitator and spin basket fit within a washtub retaining the water used for washing, and the water with the clothing inside the spin basket is drained through apertures in the spin basket.

In the process of washing, the washtub may be partially filled with water and/or detergent and other cleaning materials and the agitator may be reciprocated to dislodge dirt from the clothing. After or between one or more cycles of cleaning and rinsing, the water may be drained from the washtub and the spin basket may be rotated rapidly in a spin cycle to remove water from the clothing by centrifugal force.

It is desirable for certain washing-aids such as detergents and fabric softeners to be introduced into the washtub at different times. Accordingly, washing machines may provide for automatic washing-aid dispensing, for example, from one or more preloaded reservoirs that can be automatically triggered to release the washing-aids at different times.

In this context, it may also be desirable to provide for removable reservoirs to hold washing-aids particularly when the reservoirs are sized for holding bulk quantities of the washing-aids for multiple washing cycles. A removable reservoir simplifies loading and cleaning of the reservoir and permits the use of separately purchased preloaded bulk washing-aid cartridges. During use, the removable reservoir may be inserted, for example, in a drawer and moved to a stowed position removed from interference with the use of the appliance.

SUMMARY OF THE INVENTION

The present invention provides a sensor system for a removable liquid reservoir for an appliance such as a washing machine that can sense the amount of liquid when the reservoir is in the stowed position to notify the user when the reservoir needs refilling or emptying. The sensing system separates the sensing electronics from the removable reservoir, eliminating the need for electrical connectors between the reservoir and the appliance and lowering the cost of the reservoir container when it is desired to use preloaded bulk reservoirs. By aligning the optical axis of the sensor system with the axis of insertion of the removable reservoir, misalignment issues between the separable components may be accommodated.

Specifically, then, in at least one embodiment, the invention provides a liquid level sensing system for an appliance having a liquid reservoir with a volume adapted to hold a liquid and including a liquid port. A reservoir receptacle is adapted to releasably receive the liquid reservoir and to communicate liquid between the appliance and the reservoir through the liquid port when the liquid reservoir is received within the reservoir receptacle along an axis. The liquid reservoir further includes a window receiving light along the axis and reflecting light from an interior surface of the window adapted to contact liquid and an optical sensor assembly affixed with respect to the reservoir receptacle to transmit light along the axis into the window and to receive and measure light reflected along the axis from the window.

It is thus a feature of at least one embodiment of the invention to provide the ability to sense liquid such as washing-aid height in a removable reservoir without the need for a complex reservoir-contained sensor mechanism such as float-type devices which would increase the cost of the reservoir. By positioning the optical sensor on the reservoir receptacle, simple direct electrical communication between the optical sensor and the appliance controller can be provided. The problem of precise optical alignment of the separable components is accommodated by aligning the optical axis with the insertion axis along which tolerances accumulate.

The window may be injection molded thermoplastic.

It is thus a feature of at least one embodiment of the invention to provide a low-cost optical system that can work with an appliance reservoir.

The reservoir receptacle and liquid reservoir may provide interfitting registration surfaces positioning the height of a predetermined volume of liquid within the liquid reservoir with respect to the optical sensor when the liquid reservoir is received within the reservoir receptacle.

It is thus a feature of at least one embodiment of the invention to ensure registration between the optical sensor and reservoir in a removable reservoir system allowing separation of the sensing components.

The reservoir receptacle may receive the reservoir along a horizontal axis and the incoming light and reflected light may be aligned along the axis.

It is thus a feature of at least one embodiment of the invention to prevent variations in insertion of the reservoir from producing equal errors in washing-aid height sensing, for example, such as could occur with a vertically inserted reservoir.

The reflecting surface may be in the form of a triangular prism having first and second adjacent faces forming the reflecting surface and projecting into the volume and the incoming light and reflected light may pass perpendicularly through a third face of the triangular prism provided by an outer wall of the receptacle.

It is thus a feature of at least one embodiment of the invention to increase the sensitivity of the sensor system by providing multiple reflections at an interface between the reflecting surface and the liquid through the use of internal reflections of the prism.

The wall and prism maybe integrally formed from a light-transmissive thermoplastic material.

It is thus a feature of at least one embodiment of the invention to provide a system that can work without special optical elements inserted in the reservoir but using the material of the reservoir itself.

The third face of the prism may include a cavity formed in the third face extending into a volume of the triangular prism.

It is thus a feature of at least one embodiment of the invention to minimize thickness variation of the reservoir walls thus reducing dimensional distortion due to different shrinkage of plastic.

In one embodiment, the cavity may be positioned between a path of the incoming light and a path of the reflected light.

It is thus a feature of at least one embodiment of the invention to eliminate bulk material that is not influencing the light path and to minimize warpage during injection molding.

In this regard, the cavity may have a substantially smooth concave surface providing internal reflection within the prism.

It is thus a feature of at least one embodiment of the invention to better channel the light through the material of the prism to reduce attenuation from scatter as can occur with practical reservoir construction materials.

In an alternative embodiment, the cavity may provide a stair step surface piecewise perpendicular to the paths of incoming and reflected light.

It is thus a feature of at least one embodiment of the invention to reduce the total material thickness while minimizing unintended light reflection.

The light source may project incoming light at a first and second position corresponding to different heights of the wash-aid and the light sensor may receive reflected light at the first and second positions to sense a change in reflected light to indicate whether the washing-aid is in contact with the reflecting surface at the first or second positions.

It is thus a feature of at least one embodiment of the invention to provide for multilevel height sensing, for example, such as can provide a user with additional guidance on the amount of remaining wash-aid or which can be used to detect a missing reservoir.

In this regard, the optical sensor may include a branched light pipe having ends of the branches positioned at the two-different positions to allow a single optical element of the light sensor to communicate with the two different positions, wherein the optical element is selected from an optical emitter and an optical sensor.

It is thus a feature of at least one embodiment of the invention to eliminate the need for multiple electrical optical sensors or light sources through the use of a light pipe.

In an alternative embodiment, the optical sensor may include first and second continuous light pipes associated with at least one light sensor and one light source, the light pipes communicating between the at least one light sensor and light source and the reflective surface extending over a continuous range of different heights of wash-aid to provide an analog signal indicating a height of the wash-aid over the continuous range.

It is thus a feature of at least one embodiment of the invention to provide for "analog" type level sensing making use of a change in an amount of received reflected light caused by different levels of wash-aid.

The reflecting surface may be in the form of a concave mirror providing a focusing of incoming light from a light source of the optical sensor after reflection to a light sensor of the optical sensor.

It is thus a feature of at least one embodiment of the invention to provide for improved optical collimation for increased sensitivity and/or to provide for improved "analog" levels sensing where the amount of light reflected to the focus of a vertically extending elliptical concave surface is proportional to the height of liquid along that surface.

The optical sensor may provide at least two signals indicating, respectively, washing-aid at a first predetermined height and a missing liquid reservoir.

It is thus a feature of at least one embodiment of the invention to allow the optical sensor to detect both washing-aid height and absence of a liquid reservoir.

The optical sensor may further provide at least three signals indicating, respectively, washing-aid at a first predetermined height, washing-aid not at a first predetermined height and a missing liquid reservoir.

It is thus a feature of at least one embodiment of the invention to eliminate ambiguity between a missing reservoir and low washing-aid height.

The liquid reservoir may further include a first coupler half releasably connecting with a second coupler half joining with the first coupler half to provide a conduit therebetween when the liquid reservoir is received within the reservoir receptacle.

It is another object of the invention to minimize the effect of positional variation in the seating of the first and second coupling halves by aligning the optical axis with the direction of highest tolerance in this seating.

Other features and advantages of the invention will become apparent to those skilled in the art upon review of the following detailed description, claims and drawings in which like numerals are used to designate like features.

DETAILED DESCRIPTION OF THE PREFERRED EMBODIMENT

Figure 1:
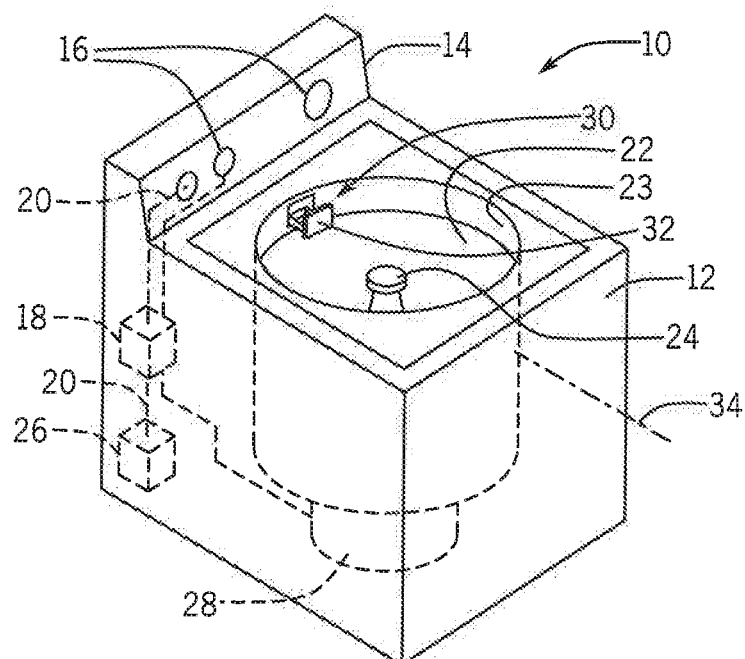
FIG. 1 is a simplified perspective view of a washing machine suitable for use with the wash-aid dispenser of the present invention showing an example upright washing machine configuration having a removable drawer for receiving a wash-aid.

Referring now to FIG. 1, a washing machine 10 may provide for an outer housing 12 having a control console 14 at the rear edge thereof presenting controls 16 (such as switches and indicator lights) for controlling the operation of the washing machine 10. The controls 16 may communicate with an internal controller 18 typically providing for a microprocessor and associated software communicating with various components of the washing machine 10 through a wiring harness 20. Those components may include, for example, the controls 16, valving and pump systems 26, and an agitator motor 28 of types understood in the art. The outer housing 12 may provide a hinged lid (not shown for clarity) at the top that may be opened so that a user may access the interior of a spin basket 22, the latter fitting inside a washtub 23. An agitator 24 may extend upward from the bottom of the spin basket 22 to agitate the clothes during washing as is generally understood in the art.

Figure 2:
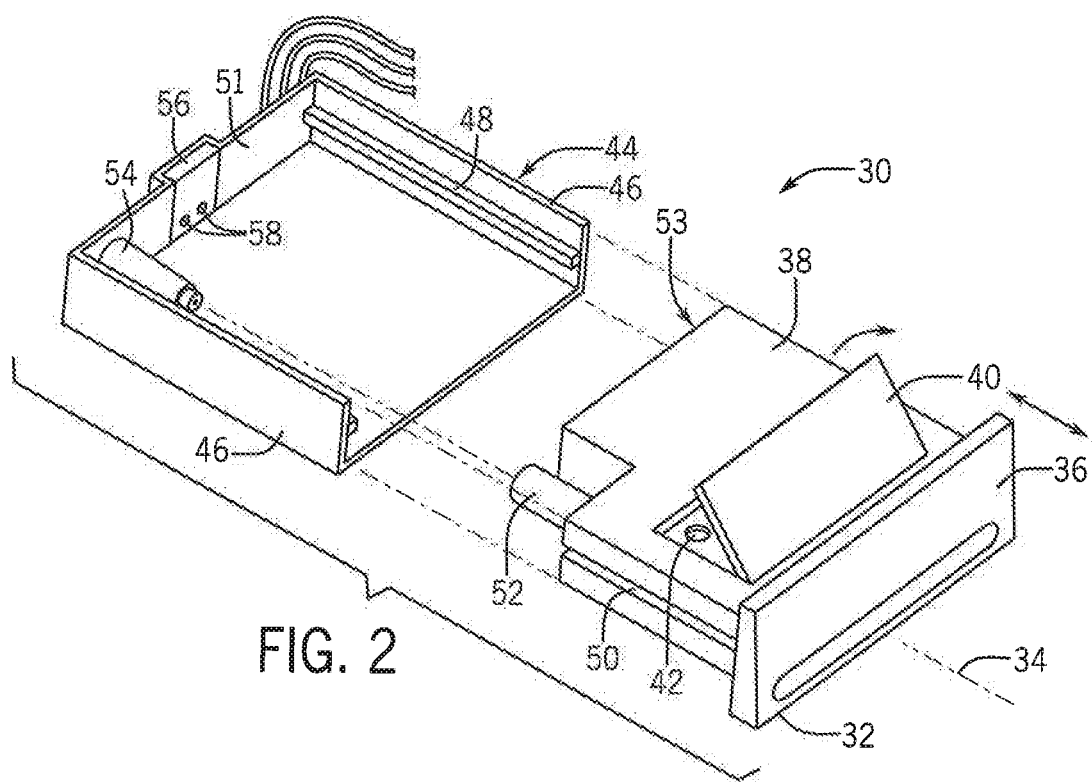
FIG. 2 is an exploded perspective view of the wash-aid dispenser of FIG. 1 showing the drawer and its receptacle in separated form, the receptacle holding an optical sensor on its rear wall.

Referring now also to FIG. 2, washing-aid dispenser 30 per the present invention may be accessible at a rear of the washtub 23 providing a drawer 32 for containing a wash-aid and removable along axis 34. Generally, the drawer may provide a front escutcheon 36 attached to a wash-aid reservoir 38, the latter providing a liquid-tight volume for holding wash-aid such as a detergent, fabric softener, bleach, whitener, or the like. An access door 40 on the top of the reservoir 38 may open to expose a washing-aid introduction port 42 through which washing-aid may be introduced.

The drawer 32 slides into a receptacle 44 providing a tray with upstanding sidewalk 46 that receive corresponding sidewalls of the reservoir 38 when the reservoir 38 is inserted into the receptacle 44 along axis 34. For this purpose and to the guide insertion process, inwardly extending guide rails 48 generally parallel to the insertion axis 34 may be positioned on each of the sidewalls 46 to slidably fit within corresponding slots 50 in the sidewalk of the reservoir 38. In this way, the height of the reservoir 38 within the receptacle 44 is precisely fixed while allowing a sliding motion.

Positioned at a rear wall 53 of the reservoir 38 is a releasable coupling 52 extending generally parallel to axis 34 to mate with a corresponding coupling 54 in a rear wall of the receptacle 44. These two couplings join when the reservoir 38 is fully received within the receptacle 44 to provide a liquid-tight conduit allowing wash-aid from the reservoir 38 to pass into the coupling 54 and from there to be distributed by valving and pump systems 26 to the laundry in the washtub 23 per conventional practice. In this regard coupling 52 may be self-sealing so as to prevent leakage of wash-aid from the reservoir 38 prior to attachment to the coupling 54.

A rear wall 51 of the receptacle 44 also holds an optical sensor system 56 exposing two laterally displaced sensor elements 58 that face a rear wall 53 of the reservoir 38 when the reservoir 38 is fully seated in the receptacle 44. When fully seated, the height of the reservoir 38 within the receptacle 44 with respect to the sensor system 56 is controlled by one or more of the rails 48, a bottom surface of the receptacle 44, and an engagement of the couplings 52 and 54.

Figure 3:
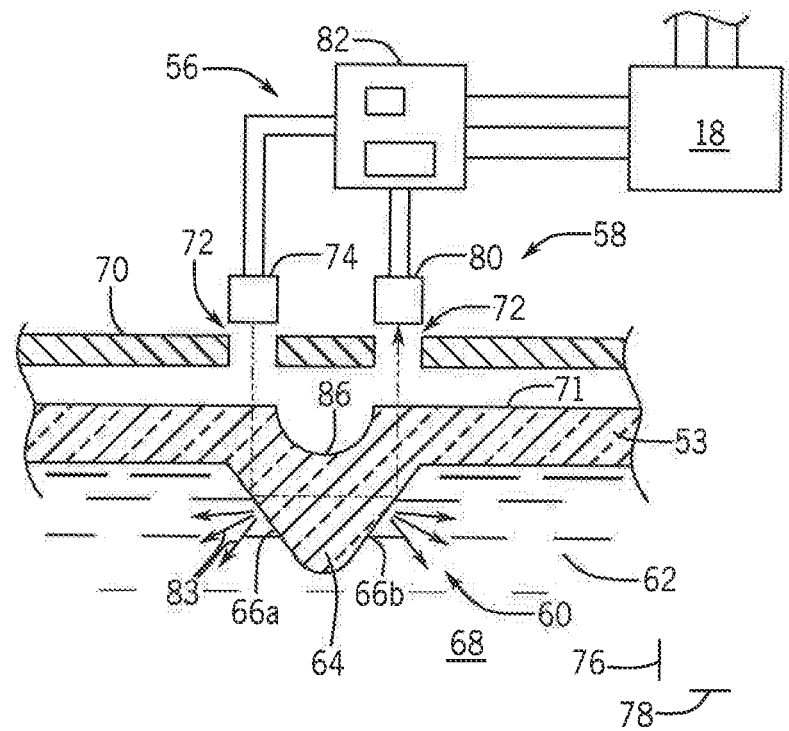
FIG. 3 is a plan cross-sectional view of a fragment of the optical sensor of FIG. 2 abutting a rear wall of the reservoir, the latter having an integrated prism, when the reservoir is engaged in the receptacle showing the sensing mechanism measuring internal reflections of the integrated prism and showing a thickness reducing notch in the base of the prism.

Referring now to FIGS. 2 and 3, a rear wall 53 of the reservoir 38 may support a refraction sensitive reflector 60 which provides a varying amount of reflected light depending on the difference between the refractive index of the refraction sensitive reflector 60 and a material with which it is contacting which may be variously a wash-aid 62 or air. Generally, the refraction sensitive reflector 60 may be integrated into the rear wall 53 of the reservoir 38, for example, by molding the reservoir 38 entirely from a transparent material or by insert molding a transparent material of the refraction sensitive reflector 60 into a separate material of the reservoir 38 or by other means such as adhesive between two separately formed elements. The refraction sensitive reflector 60 may likewise be incorporated into containers fabricated by other methods, for example, blow molding, through the use of an adhesively attached optical element either penetrating a wall of the reservoir 38 or attached to the thin transparent portion of the wall, for example, in a prepared pocket in the reservoir 38.

In one embodiment, the refraction sensitive reflector 60 may provide for a right triangular prism 64 of transparent material having a predetermined index of refraction approximately equal to that of a wash-aid 62. Two perpendicular planar faces 66a and 66b of the prism 64 may project into the interior volume 68 of the reservoir 38 with an opposed planar base 71 forming an outer surface of the rear wall 53 of the reservoir 38 opposite the planar faces 66.

As noted, the rear wall 51 of the receptacle 44 supports an optical sensor system 56 whose front face 70 abuts an outer surface of the rear wall 53 of the reservoir 38 when the reservoir 38 is fully installed within the receptacle 44. The front face 70 of the optical sensor system 56 may provide for horizontally displaced windows or openings 72, a first one communicating with a first light emitter 74 such as an LED within the optical sensor system 56 that projects light along a first axis 76 generally perpendicular with the surface of the base 71 of the prism 64 when the reservoir 38 is fully inserted in the receptacle 44. This projected light passes through an opening 72 to be received through the base 71 of the prism 64. The received light is then reflected by internal reflection off of face 66a and toward face 56b whereby, by means of similar internal reflection, it is returned back along axis 78 parallel to axis 76 through a second opening 72. After passing through the second opening 72, the light is to be received by a light detector 80 such as a photo transistor or photo diode.

The light emitter 74 and light detector 80 may attach to other circuitry 82 providing for the necessary amplification, optional modulation, decoding and threshold comparison of electrical signals communicating with the light emitter 74 and light detector 80 as will be described below, for example, to provide a signal to the user of wash-aid exhaustion. The circuitry 82 may communicate with the controller 18 to coordinate other aspects of the washing machine 10 such as the presence or absence of wash-aid 62 in the reservoir 38.

Referring still to FIG. 2, when there is no wash-aid 62 within the reservoir 38 at a sufficient height to be adjacent to the faces 66 of the prism 64 at points of light reflection, the difference in index of refraction between the material of the prism 64 and the air contacting the faces 66 will cause substantially total internal reflection of light within the prism 64 returning a significant amount of light to the light detector 80.

In contrast, when there is a wash-aid 62 adjacent to the points of light reflection (as depicted), the low difference in index of refraction between the material of the prism 64 and the wash-aid 62 diminishes causing a reduction in total internal reflection and an increase in conduction of light leakage 83 out of the prism 64 through the faces 66 into the wash-aid 62. The effect of the color of the wash-aid 62 can be diminished using an infrared light emitter 74. The presence of wash-aid 62 at the points of reflection therefore causes light loss 83 into the wash-aid 62 resulting in less light returned to the light detector 80. By placing the points of reflection in the prism 64 at a predetermined height, it can be determined if the wash-aid 62 is at or below that height by monitoring the amount of light returned to the light detector 80, for example, against a threshold that may be adjusted over time to accommodate aging in the components. In this way, the prism 64 provides a way of detecting, through internal reflection, the relative index of refraction of the material in the reservoir 38 enabling a sensor constructed in this fashion to readily distinguish between air and liquid detergent or liquid wash-aid, the latter being primarily water-based.

By aligning axes 76 and 78 to be perpendicular to the base 71 at the point of light entry, good light coupling can be had into the prism 64 despite the fact it is incorporated into a removable reservoir 38 and there is necessarily a light path through a different index of refraction of air before the light can pass into the material of the prism 64. This coupling is described, for example, by Snell's law and promoted by the fact that the base 71 is generally perpendicular to the axes 76 and 78.

Referring still to FIG. 2, a notch 86 may be cut into the base 71 of the prism 64 between the axes 76 and 78 generally removed away from the path of reflected light by removing material from the prism 64. This notch 86 reduces the variation of thickness of the plastic wall 53 in the prism area, reducing contraction and deformation and improving the geometrical stability of the prism 64. In one embodiment, this notch may be substantially smooth so as to provide internal reflection of light within the prism 64 corralling that light along a path more likely to return to the light detector 80. In this way, the effect of scattering an attenuation of light in the material of the wall 53 is compensated accommodating practical limitations in the ability to obtain pure transparency in readily fabricated materials that have suitable index of refraction.

Figure 4:
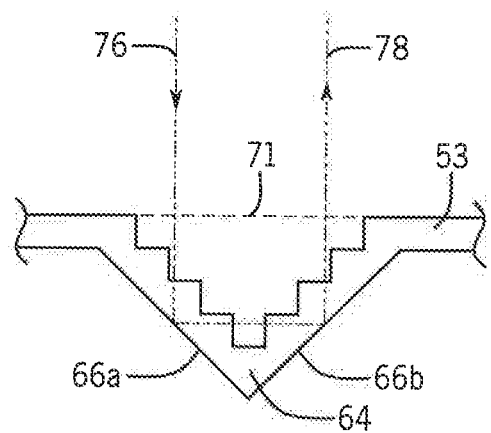
FIG. 4 is a figure similar to that of FIG. 3 showing an alternative construction of the prism using a stair step type notch.

Referring now to FIG. 4, as long as the light entering the prism 64 along axis 76 and light passing between reflective faces 66a and 66b and light returning along axis 78 enter and exit the material of the prism 64 through faces that are perpendicular to their direction of propagation, there is very little interfacial internal reflection. This allows a stair step channel to be cut through the base 71 into the interior of the prism 64 to reduce the thickness of the prism 64 reducing warpage and cost when the reservoir 38 is constructed of a molded thermoplastic or the like. In this regard, the surfaces of the stair stepping are always perpendicular or parallel to the direction of light propagation through those surfaces to reduce reflection and deflection. This approach can also reduce light sinking into the attenuating medium of the prism 64 but places more demands on molding precision and the ability of the thermoplastic material to conform to the necessary sharp corners.

Figure 5:
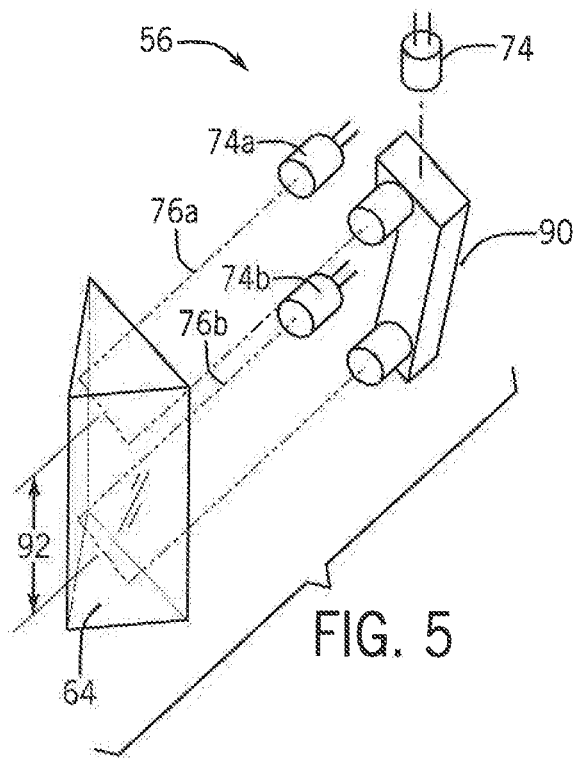
FIGS. 5 and 6 are simplified perspective views of a light emitter/light detector set for use in making measurements of two heights of wash-aid along an extended height refraction sensitive reflector.
Figure 6:
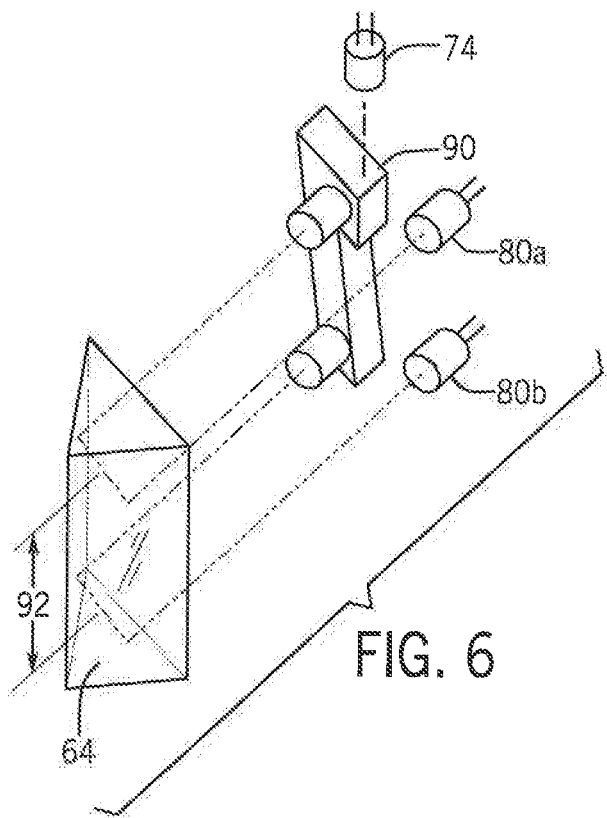

Referring now to FIGS. 5 and 6, it will be appreciated that determining the height of the wash-aid 62 against two or more vertically displaced portions of the prism 64 (or two vertically displaced prisms 64) can allow determination of the height of the wash-aid 62, not simply above or below a single level, but above or below two different height levels. Detection of reflection at two heights along the prism 64 can be provided, in principle, by duplicating the light emitter 74 and light detector 80 at two different heights. In an actual implementation, one light emitter 74 or one light detector 80 may be eliminated through the use of a light pipe providing an optical beam splitter/combiner 90 associated with either one or the other of the light detectors 80 (shown in FIG. 5) or light emitters 74 (shown in FIG. 6). In this former case, a time division multiplexing between light emitted by the light emitters 74 at two different optical paths at different heights along the prism 64 allows the light detector 80 to distinguish those two different optical paths and hence the height of wash-aid at those two heights.

For example, as shown in FIG. 5, a first and second light emitter 74a and 74b may be vertically displaced behind the front face 70 of the optical sensor system 56 (shown in FIG. 3) to project light along respective axes 76a and 76b parallel but separated by a height 92. These beams of light may be received by an extended height prism 64 and reflect off of face 66a so that the light beam along axis 76a returns along axis 78a to be received by one entry point of a beam splitter/combiner 90 conducting the light to a light detector 80, and the light along axis 76b returns along axis 78b to be received by a second entry point of beam splitter/combiner 90 to be conducted to the light detector 80. By alternately pulsing the first and second light emitters 74a and 74b in time with the detection of the light received at light detector 80, separate measurements may be made of the existence of a high index of refraction wash-aid 62 at the height of axis 76a and the height of axis 76h.

Likewise, as shown in FIG. 6, the beam splitter/combiner 90 may be used in a forward direction and associated with a single light emitter 74 (for example, oriented vertically as is the case with light detector 80 in FIG. 5) to provide two simultaneous beams of light separately detected by two light emitters 80a and 80b also vertically displaced by the height 92.

Invention also contemplates that there may be beam splitters on both emitter and detector. In this case there is no time multiplexing but an analog measure of light feedback. Each time the detergent level covers or uncovers a branch of one of the splitters there will be a variation of light feedback at detector. With two sensing position (a beam splitter with one bifurcation) variations provide for three steps of 100%, 50% and 0% signal transmission. With beam splitters each having four branches, the variations provide for 100-75-50-25-0% signal variations.

Figures 7, 8, 9:
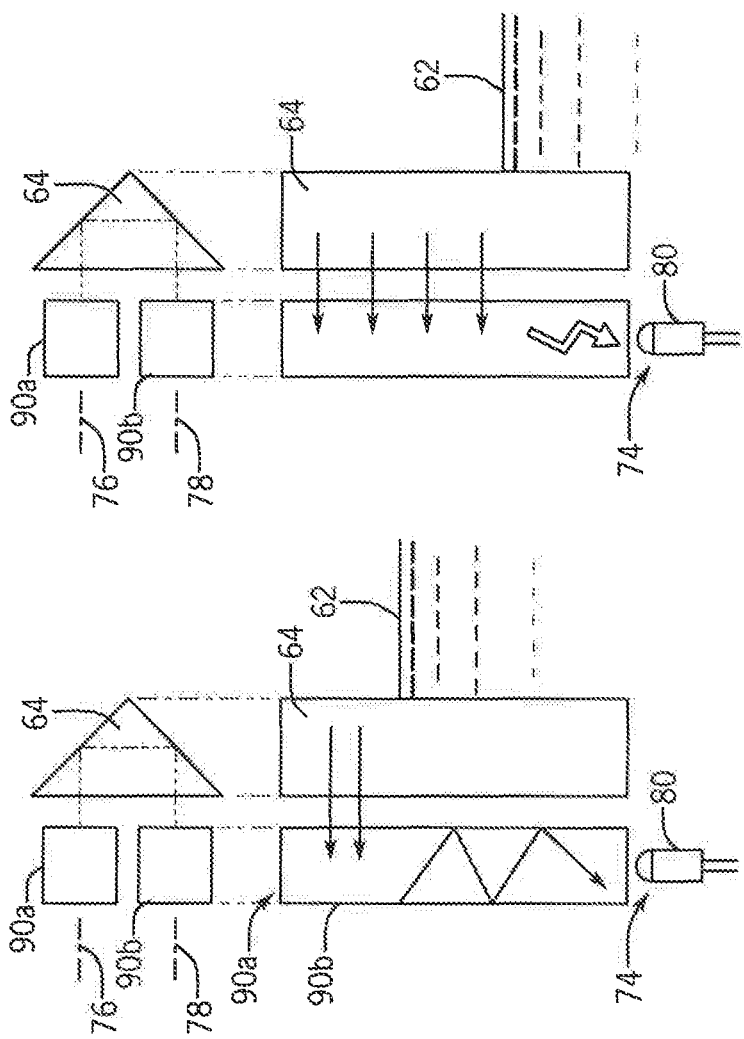
FIG. 7 is a top plan and side elevational view of an alternative sensing structure providing an analog measure of wash-aid height by collecting light from multiple levels of the refraction sensitive reflector, FIG. 7 depicting a case where the wash-aid is at a high level.
FIG. 8 is a figure similar to that of FIG. 7 showing a change in collected light as the wash-aid drops.
FIG. 9 is a figure similar to that of FIG. 3 showing an alternative to the prism of FIG. 3 using a refraction sensitive reflector providing a collimating property.

Referring now to FIG. 7, substantially continuous resolution of the height of wash-aid 62 along a height of an extended height prism 64 may be made by using a vertically oriented dispersing light pipe 90a and a vertically oriented collimating light pipe 90b associated, respectively, with a light emitter 74 and light detector 80. Specifically, the dispersing light pipe 90a receives light along a vertical axis and disperses that light horizontally to project toward the prism 64 at multiple heights in the manner of a backlight in this regard, the dispersing light pipe 90a may provide for multiple internal reflections to distribute light along the length of the dispersing light pipe 90a while having a prismed surface releasing light toward the prism 64 at the various heights. Correspondingly, the collimating light pipe 90h may receive light from the prism 64 at a variety of heights and collect that light to be collimated to a single light detector 80.

It will be appreciated that when the wash-aid 62 is relatively high (for example, as shown in FIG. 7) there will be very little returned light from the prism 64 received by the collimating light pipe 90h and conducted to the light detector 80 in comparison to when the wash-aid 62 is lower in height allowing additional light to be reflected back from the prism 64 into the collimating light pipe 90h to be receive by detector 80. The amount of light detected by the detector 80 will be inversely proportional to the height and may thus provide a continuous measure of height of the wash-aid 62.

Referring now to FIG. 9, it will be appreciated that the refraction sensitive reflector 60 need not be a prism 64 but could be constructed having a curved surface 100 exposed to the volume 68 of the reservoir 38 acting as an internal reflector when not abutting wash-aid 62. This curved surface 100 may provides an elliptical focusing mirror, for example, in the shape of a parabola providing a focused transmission of reflected light from a light emitter 74 to a detector 80. Optionally, the outer surface of the reservoir 38 may likewise provide for curved lens forms 102 providing a transition of light into and out of the prism 64 through surfaces of the lens forms having one or two that are substantially perpendicular to the propagation direction of the light to reduce internal reflections on the outer side of the reservoir 38. Alternatively, or in addition, the curved lens forms 102 may provide for standard refractive plano-convex lenses augmenting optical coupling with the light emitter 74 and light detector 80. It will be appreciated that other collimating or focusing elements may be also used to provide a more precise determination of the level of the wash-aid 62 by focusing the light on a very small area on the interface between the refraction sensitive reflector 60 and material inside the reservoir 38 or to provide "analog" type sensing in which returned light portion to the amount of the ellipse covered by liquid.

Figure 10:
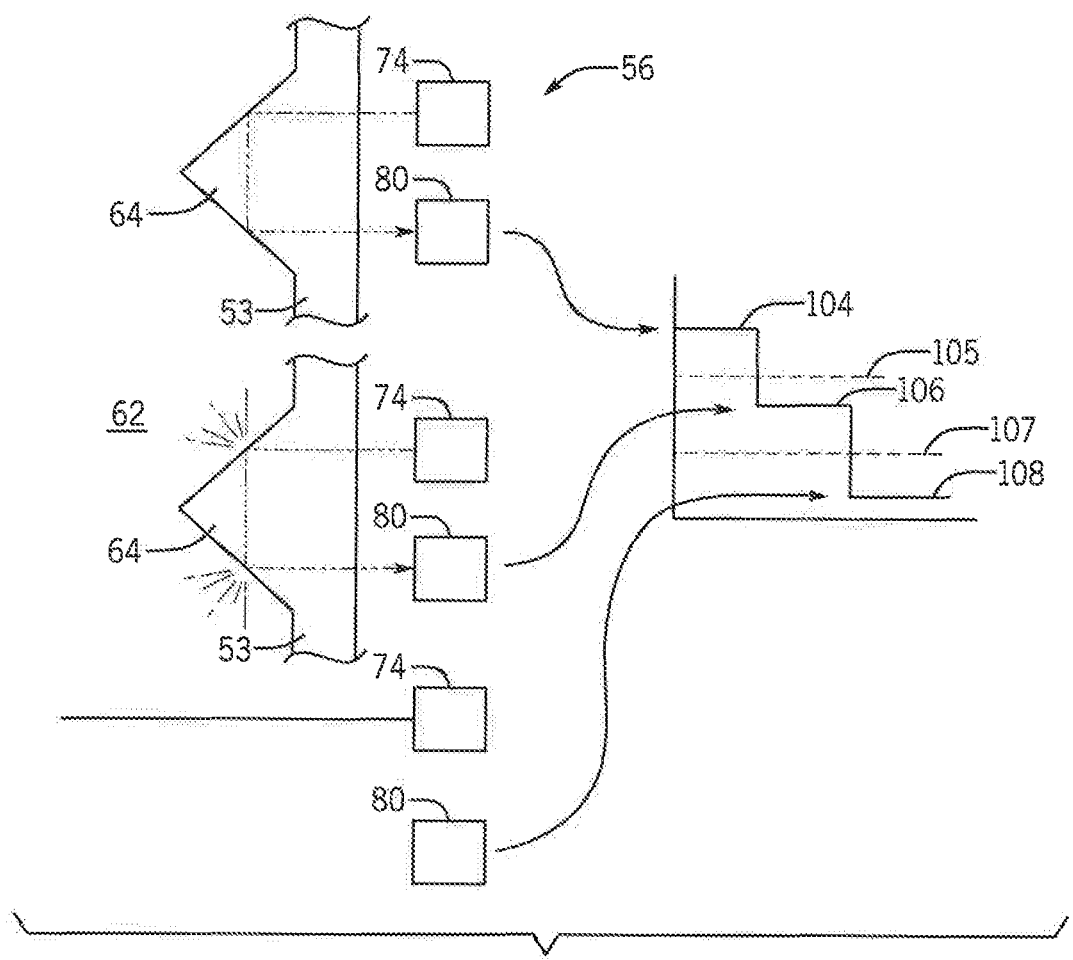
FIG. 10 is a series of simplified representations of the prism of FIG. 3 under conditions of no wash-aid, full wash-aid, and no reservoir showing distinguishing signals for each of these states.

Referring now to FIGS. 2 and 10, the optical sensor system 56 can also be enlisted to detect whether the reservoir 38 is in place within the receptacle 44 by applying a threshold to the signals received from sensors 80 that distinguish three cases on (1) the absence of wash-aid 62 against the surface of the prism 64 such as causes strong internal reflection and a high signal level 104 above a first threshold 105 in the signal received by light detector 80, (2) the presence of wash-aid 62 against the surface of the prism 64 causing a weakened internal reflection and a mid-level signal level 106 below threshold 105 but above a second lower threshold 107, and an absence of the receptacle entirely causing a very low light level 108 to be received from the light detector 80 below the threshold 107.

Figure 11:
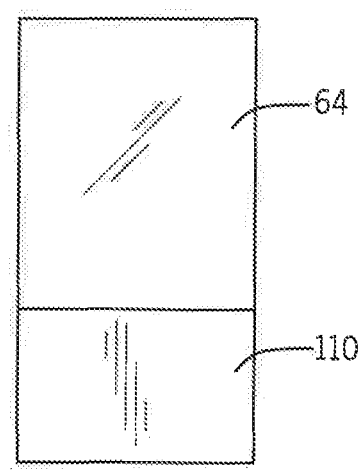
FIG. 11 is a front elevational view of the base of the extended prism of FIGS. 5 and 6 showing application of the reflective material for sensing of the reservoir.

Referring now to FIGS. 5, 6 and 11, it will also be appreciated that the embodiment of FIGS. 5 and 6 may dedicate one of the optical paths to a detection of the reservoir 38, for example, by placing a highly reflective material such as a metal foil 110 or the like over the lower portion of the extended prism 64 to provide a reflector whose absence clearly indicates the absence of the reservoir 38.

While the present invention has been shown with respect to a vertical axis washing machine, similar principles may be used for a horizontal axis machine.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A liquid level sensing system for an appliance comprising:
    a liquid reservoir having a volume adapted to hold a liquid wash-aid and including a liquid port;
    a reservoir receptacle adapted to releasably receive the liquid reservoir and to communicate liquid between the appliance and the reservoir through the liquid port when the liquid reservoir is received within the reservoir receptacle along an axis;
    a liquid-tight conduit defining a liquid passage between the liquid reservoir and the reservoir receptacle for conveying the liquid wash-aid when the liquid reservoir is received within the reservoir receptacle, the liquid-tight conducing including:
        a first conduit segment arranged at the liquid reservoir and communicating with the liquid port;
        a second conduit segment arranged at the reservoir receptacle;
    wherein the first and second conduits communicate with each other when the liquid reservoir is received within the reservoir receptacle to define the liquid-tight conduit and are separated from each other when the liquid reservoir is removed from the reservoir receptacle;
    wherein the liquid reservoir further includes a window receiving light along the axis and reflecting light from an interior surface of the window adapted to contact liquid; and
    wherein the reservoir receptacle further includes an optical sensor assembly affixed with respect to the reservoir receptacle to transmit light along the axis into the window and to receive and measure light reflected along the axis from the window.

2. The liquid level sensing system of claim 1 wherein the window is injection molded thermoplastic.

3. The liquid level sensing system of claim 2 wherein the interior surface is in a form of triangular prism having first and second adjacent faces forming the interior surface and projecting into the volume and wherein the transmitted light and received light pass perpendicularly through a third face of the triangular prism provided by an outer wall of the receptacle.

4. The liquid level sensing system of claim 3 wherein the third face includes a cavity formed in the third face extending into a volume of the triangular prism.

5. The liquid level sensing system of claim 4 wherein the cavity is positioned between a path of the transmitted light and a path of the received light.

6. The liquid level sensing system of claim 5 wherein the cavity is a substantially smooth concave surface providing internal reflection of light within the prism.

7. The liquid level sensing system of claim 5 wherein the cavity provides a stair step surface piecewise perpendicular to paths of incoming and reflected light.

8. The liquid level sensing system of claim 2 wherein the interior surface is in a form of a concave mirror providing a focusing of incoming light from a light source of the optical sensor after reflection to a light sensor of the optical sensor.

9. The liquid level sensing system of claim 1 wherein the liquid receptacle and window are integrally formed from thermoplastic material.

10. The liquid level sensing system of claim 1 wherein the reservoir receptacle and liquid reservoir provide interfitting registration surfaces positioning a height of a predetermined volume of liquid within the liquid reservoir with respect to the optical sensor when the liquid reservoir is received within the reservoir receptacle.

11. The liquid level sensing system of claim 1 wherein the optical sensor includes a light source projecting incoming light at first and second positions of the window corresponding to different heights of the liquid and the optical sensor includes a light sensor receiving reflected light at the first and second positions and wherein the optical sensor independently senses a change in the reflected light at the first and second positions to indicate whether liquid is in contact with the interior surface at the first or second positions.

12. The liquid level sensing system of claim 11 further including a branched light pipe having ends of the branches positioned at the first and second positions to allow a single optical element of the light sensor to communicate with the two different positions, wherein the optical element is selected from an optical emitter and an optical sensor.

13. The liquid level sensing system of claim 1 further including first and second continuous light pipes associated with at least one light sensor and one light source, the light pipes communicating between the at least one light sensor and light source and the interior surface extending over a continuous range of different heights of liquid to provide an analog signal indicating a height of the liquid over the continuous range.

14. The liquid level sensing system of claim 1 wherein the optical sensor provides at least two signals indicating, respectively, washing-aid at a first predetermined height and a liquid reservoir not received within reservoir receptacle.

15. The liquid level sensing system of claim 14 wherein the optical sensor provides at least three signals indicating, respectively, washing-aid at a first predetermined height, washing-aid not at a first predetermined height and a liquid reservoir not received within reservoir receptacle.

16. The liquid level sensing system of claim 1 wherein:
the first conduit segment of the liquid reservoir defines a first coupler halt; and
second conduit segment of the reservoir receptacle defines a second coupler half;
wherein releasably connecting the first coupler half to the second coupler half provides the liquid-tight conduit when the liquid reservoir is received within the reservoir receptacle.

17. The liquid level sensing system of claim 1 wherein the reservoir receptacle may receive the reservoir along a horizontal axis and the transmitted light and received and measured light may travel in a direction aligned along the axis.

* * * * *